E. COLLETT.
PROCESS FOR CONCENTRATING DILUTE NITRIC ACID.
APPLICATION FILED OCT. 13, 1913.
1,133,840.
Patented Mar. 30, 1915.
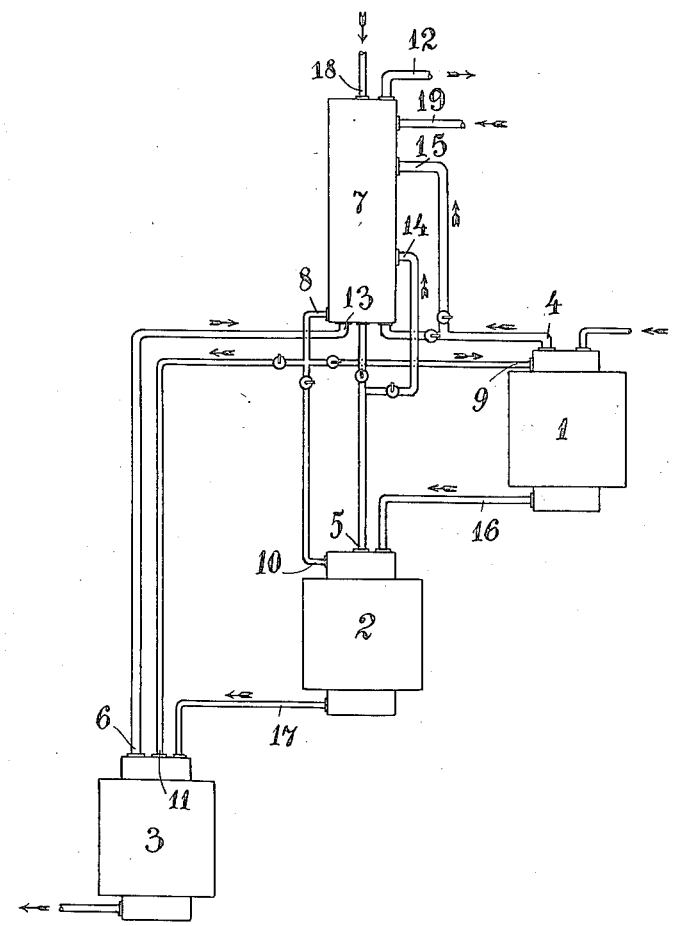

UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR CONCENTRATING DILUTE NITRIC ACID.

1,133,840.

Specification of Letters Patent. Patented Mar. 30, 1915.

Application filed October 13, 1913. Serial No. 794,936.

*To all whom it may concern:*

Be it known that I, EMIL COLLETT, a subject of the King of Norway, residing at Christiania, Norway, have invented certain new and useful Improvements in Processes for Concentrating Dilute Nitric Acid; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In various industries large quantities of dilute nitric acid are obtained for instance by electric oxidation of the nitrogen of the air. Many methods have been tried to concentrate this dilute acid, for instance, by adding inert water binding substances; the nitric acid was then expelled in concentrated form by heating. As far as is known, however, this problem has not been solved in an economically satisfactory manner.

The difficulty consists in obtaining the dilute acid concentrated up to about 60–70% without the use of the water-attracting agents. With an acid of this concentration a highly concentrated nitric acid is readily produced in a well known manner. As is known, nitric acid of a lower concentration than 68% is concentrated by boiling, the vapors being not of the same composition as the boiling acid, before the said concentration has been reached. However, a dilute nitric acid is difficult to concentrate economically by simply boiling it, and as a large proportion of the acid passes away with the vapors the output of concentrated acid is therefore very slight.

Applicant has found that dilute nitric acid may be very conveniently concentrated when proceeding in the manner hereinafter described reference being had to the accompanying drawing, which is a diagrammatic view of one form of apparatus for carrying out the present process.

In said drawing, 1, 2, and 3 designate three apparatuses for concentrating nitric acid by boiling; 4, 5, and 6, the pipes through which the acid vapors, escaping from the evaporation apparatus, pass into a dephlegmation column 7.

8, 9, 10, and 11 designate pipes through which acid in a liquid state flows back from the dephlegmation column into the concentration apparatus.

12 is a pipe for the escape of vapors from the dephlegmation column.

16 and 17 are pipes connecting the concentration apparatus.

18 is a pipe through which water or dilute acid may be supplied to the dephlegmation column.

19 is a pipe through which the acid to be concentrated may be introduced into the dephlegmation column.

The dilute nitric acid is boiled in the evaporating apparatus (1) which is made of an acid proof material. The vapors escaping are conducted to the dephlegmation column 7, whereby they are separated into aqueous vapor and concentrated acid. The aqueous vapors will escape and the acid flow back to the boiler. When the acid has obtained a concentration of about 65–70%, the quantity supplied and discharged is so controlled that the concentration of the acid will remain constant. While this method of concentration, according to circumstances, may be of advantage it has, however, the drawback that the dephlegmation column is highly charged with concentrated acid vapor which again necessitates making the column very large. To also avoid this inconvenience the following process may be employed. The nitric acid is heated in a suitable concentrating apparatus (1) until boiled; the acid is allowed to boil in this apparatus until the concentration has gone up from, for instance, 30 to 40%. The vapor escaping in this stage of cencentration is relatively low in nitric acid and accordingly mainly consists of aqueous vapor. After the desired concentration has been obtained, the acid is conducted to another similar apparatus (2), in which the evaporation of the water is continued; in this apparatus the concentration is carried on, for instance, from 40 to 50%; the aqueous vapor, escaping during this stage of concentration, is mixed with nitric acid vapor. When the desired concentration has been obtained, the acid is further conducted to a similar apparatus (3), in which the concentration is carried on for instance up to about 60–68%. The vapors escaping during this stage of the concentration are high in nitric acid. Of course the concentration may be effected in more stages than herein mentioned.

The vapors issuing from the concentrating apparatus (at 4, 5 and 6 respectively), in order to extract the nitric acid contained in the same, are conducted to one or more dephlegmation columns (7), in which the vapors are subjected to dephlegmation in a known manner. The nitric acid delivered from the dephlegmation column (at 8) is again supplied to the concentration apparatus at a suitable point (at 9, 10 or 11 respectively). The vapor issuing from the dephlegmation column, (at 12) under normal conditions, consists of nearly pure water which for instance, after condensation, may again be used to absorb nitrous gases for the production of nitric acid, etc. The vapors are very advantageously introduced from the various concentrating apparatus into the dephlegmation columns at points located one above the other (at 13, 14 and 15 respectively) the most concentrated vapors being introduced at the bottom and the more dilute ones at a higher point of the column. The aqueous vapor issuing from the first concentrating apparatus may also be separately condensed and again used in the apparatus in which the dilute nitric acid is produced. It is thus also possible to separate a large proportion of the vapor containing small quantities of nitric acid, and a comparatively small proportion containing a larger quantity of nitric acid. By means of the said dephlegmation column these vapors may then be separated into their components so as to eventually obtain, as already mentioned, only concentrated nitric acid and pure or nearly pure water. Of course the apparatus preferably operates continually the acid flowing from one apparatus to the other (at 16 17).

It is of great advantage to supply the dilute acid at the top of the dephlegmation column, a heating of the acid being thereby obtained which again increases the efficiency of the apparatus. To obtain the best dephlegmation possible a dilute acid or water may be added to the dephlegmation column (at 18) in such a quantity as to obtain a practically complete dephlegmation. The upper limit of the acid concentration has been found to be at about 15-20%. If therefore an acid of this concentration be added, practically only aqueous vapor will escape from the top of the column. Since, as already mentioned, it is advantageous to also add the acid, that is to be concentrated, in the dephlegmation column, this may conveniently be done by introducing the same (at 19) somewhat below the point (18) at which the said dilute acid or water is added. Through the evaporation by steps, the great advantage obtained is that, the removal of most of the water is effected at a comparatively low concentration of the acid, consequently the evaporating apparatus, in which the bulk of the water is evaporated, may be constructed for the corresponding low temperature and pressure, or the apparatus, at equal pressure and temperature of the vapor, will obtain a materially greater efficiency. Moreover the process has the advantage of obtaining on one hand substantially all the nitric acid of the desired concentration, and on the other hand substantially pure aqueous vapor. Heretofore it has not been possible to accomplish this by any of the known processes.

I claim:

1. The process of concentrating dilute nitric acid which comprises, evaporating the acid in stages of different concentrations, dephlegmating and condensing the resulting acid vapors while permitting the escape of aqueous vapor, and returning the condensed vapors to one of the stages.

2. The process of continuously concentrating dilute nitric acid which comprises, evaporating acid in stages of different concentrations, dephlegmating and condensing the vapors resulting from the several stages while permitting the escape of aqueous vapor from the vapor of a lower stage, returning the condensed vapors from all the stages to one of the lower stages, and maintaining a constant flow of concentrates from the lowest to the highest stage.

3. The process of concentrating dilute nitric acid which comprises, evaporating the acid in stages of different concentrations, and dephlegmating and concentrating the resulting acid vapors in the inverse order of their concentration.

4. The process of concentrating dilute nitric acid which comprises, evaporating the acid in stages of different concentrations, dephlegmating and concentrating the resulting acid vapors in the inverse order of their concentration by first condensing the vapors from the lowest stage, then using the condensate to condense the vapors of the next lowest stage, etc., and returning the entire condensate to anyone of the stages.

5. The process of concentrating dilute nitric acid which comprises, evaporating the acid in stages of different concentrations, dephlegmating and condensing the resulting acid vapors in the presence of a nitric acid absorbing liquid while permitting the escape of aqueous vapor, and returning the condensed vapors to one of the stages.

6. The process of concentrating dilute nitric acid which comprises, evaporating the acid in stages of different concentrations, dephlegmating and condensing the resulting acid vapors in the presence of weak acid while permitting the escape of aqueous vapor, and returning the condensed vapors to one of the stages.

7. The process of continuously concentrating dilute nitric acid which comprises, evaporating acid in stages of different concentrations, dephlegmating and condensing in the presence of weak nitric acid, the vapors resulting from the several stages while permitting the escape of aqueous vapor from the vapor of a lower stage, returning the condensed vapors from all the stages to one of the lower stages, and maintaining a constant flow of concentrate from the lowest to the highest stage.

8. The process of continuously concentrating dilute nitric acid which comprises, evaporating acid in stages of different concentrations, dephlegmating and condensing in the presence of weak nitric acid, the vapors resulting from the several stages in the inverse order of their concentration, while permitting the escape of aqueous vapor from the vapor of a lower stage, returning the condensed vapors from all the stages to one of the lower stages, and maintaining a constant flow of concentrates from the lowest to the highest stage.

In testimony that I claim the foregoing as my invention, I have signed my name in presence of two subscribing witnesses.

EMIL COLLETT.

Witnesses:
M. E. GUTTORENSEN,
RUTH LINDSTRÔM.